United States Patent [19]
Clarke et al.

[11] Patent Number: 5,903,153
[45] Date of Patent: May 11, 1999

[54] APPARATUS AND METHOD FOR DETECTING UNDERGROUND LIQUIDS

[75] Inventors: Richard Hedley Clarke; John William Aidan Millar, both of Wiltshire, United Kingdom

[73] Assignee: Court Services Limited, United Kingdom

[21] Appl. No.: 08/727,453

[22] PCT Filed: Apr. 13, 1995

[86] PCT No.: PCT/GB95/00844

§ 371 Date: Oct. 18, 1996

§ 102(e) Date: Oct. 18, 1996

[87] PCT Pub. No.: WO95/28659

PCT Pub. Date: Oct. 26, 1995

[30]    Foreign Application Priority Data

Apr. 18, 1994 [GB] United Kingdom ................... 9407645
Sep. 20, 1994 [GB] United Kingdom ................... 9418951

[51] Int. Cl.$^6$ ............................. G01V 11/00; G01V 3/12; G01V 3/30; G01V 1/00
[52] U.S. Cl. .......................... 324/323; 324/344; 324/347; 324/334; 367/14
[58] Field of Search ..................................... 324/323, 324, 324/334, 344, 347, 354; 367/14, 37, 38

[56]    References Cited

U.S. PATENT DOCUMENTS 2,054,067  9/1936  Blau et al. .............................. 324/323

*Primary Examiner*—Walter E. Snow
*Attorney, Agent, or Firm*—Ronald B. Sherer

[57]    ABSTRACT

A method and apparatus for detecting underground liquids is disclosed in which the electrical potential generated by a seismic shock is detected and measured with respect to a base point insulated from the earth.

23 Claims, 3 Drawing Sheets

APPARATUS AND METHOD FOR DETECTING UNDERGROUND LIQUIDS

The present invention relates to a method and equipment for detecting fluids underground and particularly relates to a method and equipment which can be used to detect liquids such as water or hydrocarbons in porous rocks.

The most commonly used method for detecting liquids underground is by means of seismic prospecting using acoustical waves from a seismic source at or near the surface. It is known that the seismic waves reflected by interfaces between rock layers and such reflections can be used to map subsurface structures.

Recently, in order to obtain better results, three dimensional seismic surveys have been used, particularly within the oil industry. However, these methods all suffer from drawbacks and can only perform poorly in detecting underground liquids.

In addition to hydrocarbons it is also important to detect other underground liquids such as water for civil engineering and other purposes.

Methods have also been proposed for the detection of underground liquids using existing equipment but relying on electrical phenomena. U.S. Pat. No. 2,054,067 describes a method in which the changes in the resistance of the earth between two electrodes resulting from an acoustical charge is measured and used to ascertain information about the underground structure. U.S. Pat. No. 2,354,659 describes a method which utilises the DC current which may be generated when fluids, displaced by a seismic shock, return to their original location. However these methods either generate signals which are too weak to detect or measure accurately or are only useful at very shallow depths.

Methods have also been proposed which measure the resistivity of the earth in various places and rely on the variation in electrical resistivity of the earth in the presence of conductive liquids to indicate the presence of such liquids; however this has proved to be of limited effectiveness.

U.S. Pat. No. 4,904,942 describes a method for detecting conductive fluids underground by generating a seismic impulse at or near the surface of the earth and using electronic or magnetic detectors to detect an electromagnetic signal generated by a dipolar movement in a region containing two immiscible fluids.

The preferred detectors disclosed are two rod-like electrodes spaced apart at a distance of about 15–2000 feet or 4.6–610 meters with the rods being driven down to the first water table beneath the surface with preferably an array of detectors being used. The electrodes are connected, optionally, in series with a battery to the primary coil of a transformer, the secondary coil of which is connected via a notch filter to a recorder which measures the electrical fluctuations generated.

The method disclosed in this invention measures the electrical potential between two electrodes placed in the earth and employs a conventional seismic array of receptors and uses a conventional arrangement, with the receptors being in the position for normal seismic work.

It has been found that this method does not give accurate results and, in particular, has a low signal to noise ratio which makes interpretation of the results difficult.

The present invention differs from the invention described in U.S. Pat. No. 4,904,942 in that the electrical potential between one location and a base point insulated from the earth is measured and compared with the electrical potential between another location and the base point to obtain signals. This suprisingly gives better and clearer results than in U.S. Pat. No. 4,904,942.

The invention provides a method for detecting an underground liquid which method comprises initiating a seismic impact which passes through the earth, measuring the electrical potential generated by the shock from the seismic impact interacting with sub-surface rock containing the liquid at least two different locations, and comparing the measured electrical potentials at two different locations so as to indicate the presence of the liquid by means of a comparison device which generates a signal in proportion to the difference between the electrical potentials at the two locations.

The invention also provides equipment for detecting the presence of an underground liquid which equipment comprises a means for initiating a seismic shock et or near the surface of the earth and a means for measuring and comparing the electrical potential generated by the interaction of the seismic shock with fluid contained in porous rock at two or more locations, in which the means for measuring the electrical potential can measure e electrical potential difference between a location and a non-earthed base point.

By electrically isolated is meant that there is no electrical conductor connecting the two signals e.g. they do not connect to an electromagnetic device such as a transformer, voltmeter, ammeter etc. Preferably the signal from each location is led to a separate input stage of an amplifier which generates a signal proportional to the difference in electric potential or voltage at each electrode and the common earth, which may be a floating virtual earth.

In one embodiment of the invention the equipment according to the invention comprises a means for detecting and measuring the electrical potential generated at two different locations by a seismic shock passing through liquid containing rock and comparing the electrical potential at these two locations by means of a comparison means so as to indicate the presence of the liquid containing rock, in which there are detector means able to pick up electrical signals generated in the earth end, except for these detector means, the equipment is able to be electrically isolated from the earth and in which the electrical signals from each of the locations can be kept electrically isolated from each other until they are fed into the comparison means.

The seismic shock can be generated using conventional equipment and methods such as by a hammer and plate, explosives, a vibrational source or other known means; the shock may be a continuous oscillation or an impulse. Preferably the means for measuring and comparing the electrical potential comprises electrodes which can be placed on or in the earth and which are connected to an electrical circuit in which the electrical potential from each of the electrodes can be measured in relation to a non-earthed base point and these two electrical potentials can be compared to indicate the presence of liquid containing rock.

The electrical circuit can comprise an amplifier connected to the electrodes and to which the signals from each electrode is passed and a data acquisition and recording means connected to the amplifier to record the signal so generated.

Preferably the non-earthed base point comprises the body of the equipment and data acquisition circuitry which is electrically insulated from the earth.

Preferably there are at least two pairs of electrodes, placed in or on the ground and preferably the signal from the two electrodes in each electrode pair are fed into separate circuits and are isolated from each other and earth, i.e. they are "floating".

In use in the method of the invention preferably the electrodes are arranged in electrode pairs comprising an inner and outer electrode based on the distance from the seismic source.

By inner and outer electrodes or pairs of electrodes is meant inner and outer relative to the point where the seismic shock is initiated i.e. nearer or further to this point. This can be achieved by having four electrodes preferably spaced symmetrically in a straight line from the point where the seismic shock is generated, herein called the seismic source with two pairs of electrodes on opposite sides of the seismic source.

Preferably the innermost electrode in each pair is placed as close as possible to the seismic source.

By being on opposite sides of the point where seismic shock is initiated is meant, that if a first line is drawn between the electrodes and a second line is drawn from the point where the seismic shock is initiated perpendicular to the first line the intersection of these two lines is between the electrodes.

Preferably the electrodes and the point where the seismic shock is initiated lie substantially in a straight line with the point where the seismic shock is initiated substantially midway between the two inner electrodes.

Each pair of electrodes can be considered as an antenna, each antenna consisting of an inner electrode, which is preferably as close as possible to the seismic source, where the signal voltages are largest, and an outer electrode which is farther away.

Preferably the antennas are arranged in an array and the antennas of the antenna array are disposed symmetrically about the seismic source so that along any flat plane passing through the seismic source and an antenna there is another antenna spaced at an equal distance on the other side of the seismic source.

In another embodiment of the invention there is a symmetrical arrangement of the electrodes around the seismic source and although signals are received from both sides of the seismic source, only one signal is used.

In a preferred configuration, the electrodes are placed on opposite sides of and in line with the seismic source and each electrode pair measures the horizontal component of the electromagnetic field between the two end points of each electrode.

The data acquisition circuitry forming part of the detection means is preferably fully isolated from the earth and is part of and is at the same potential as the base point, except that the electrodes themselves are in contact with the earth to enable them to receive the electrical signals generated.

Preferably the data acquisition system floats at a voltage equal to the average earth voltage at any time at the survey site, however there will in practice be a fraction of the supply battery voltage of the battery used to operate the data acquisition circuit which can be ignored.

Preferably there are means to compensate for differences in the contact resistance encountered between the electrodes and the earth for each electrode in each electrode pair and this can be achieved, for example by connecting each electrode to a separate input amplifier stage and making provision to adjust the gain of that input stage. Alternatively there can be a variable resistor in each circuit which can be adjusted to equalise the resistance in each circuit.

The amplifier will amplify voltage differences between the inner and outer electrodes which accurately represent the voltages generated in the sediment or rock because of the symmetrical arrangement of the antenna array and there is provision for compensation for variations in contact resistance between the inner and outer electrodes of each antenna.

In this specification the term signal is restricted to the voltages generated by seismic impulses in rocks which contain liquid and the term noise in this context is used to describe all other detected voltages Unexpectedly, we have found that the method of the invention for treating the signal and the use of electrodes relatively close to the seismic source gives a much better signal than previously disclosed and used methods and arrangements. In particular, it has been unexpectedly found that increasing the distance of the electrodes from each other and from the seismic source increases the amount of noise in the signal.

When the distance between the inner and outer electrode in an electrode pair is increased beyond the appropriate distance, it increases the amount of noise relative to the amount of signal. It has also been found that when the inner electrodes in an electrode pair are moved away from the seismic source, the signal strength decreases.

In previously disclosed and used methods of using seismic shock for the detection of fluids or fluid bearing layers beneath the earth a large array of receptors are used and are spaced a relatively large distance apart to obtain a range of signals for analysis and to obtain the necessary information and this contrasts with the method of the present invention. In a preferred embodiment of the invention when the rock strata are substantially flat, the angle between a line drawn from the inner electrode in each electrode pair to the layer containing fluid and a perpendicular line from the seismic source is less than five degrees and more preferably less than two degrees In many cases this will correspond to distance on the surface of less than 2.5 meters.

If the layer containing the fluid is not substantially flat, i.e. is not substantially parallel to the surface of the earth, then the antenna positions are displaced an appropriate amount; that is, the centre of the antenna pattern is no longer the position of the seismic source but is vertically above the intersection of the shortest possible fine drawn from the seismic source to the layer with the fluid.

The electrodes can be made of any suitable conductive material and, in order to make better contact the electrodes can be in the form of metal rods, e.g. of stainless steel driven into the ground, e.g. to a depth or 0.1 to 2.0 meters. In order to make better electrical contact, the ground surrounding the electrodes can optionally be moistened with an aqueous liquid preferably ionic. In low noise conditions, satisfactory signals can be obtained when the electrodes are placed in the ground.

Preferably the signals from each of the detector means are fed into an operational amplifier such as a differential operational amplifier.

The differential operational amplifier can be of conventional design and operation and preferably has a high gain throughout the frequency range of 4 Hz to 4000 Hz.

Preferably there is provision for isolating and balancing the signals from each of the electrodes in antenna before they reach the differential operational amplifier in order to give maximum common-mode rejection of electromagnetic noise. This balancing can be achieved manually by as described in this embodiment of the invention or electronically using suitable circuitry. Preferably each electrode in each electrode pair is connected to a separate input amplifier stage and provision is made to adjust the gain of the input stage of one electrode in each antenna for differences in the contact resistance encountered between the electrodes placed on the ground.

The signal from the amplifier can be passed to a computer for manipulation, storage and analysis. In a preferred embodiment the data acquisition is carried out on a computer controlling an analogue to digital data acquisition card, e.g. one allowing 12 bit sensitivity and programmable analogue ranges, sampling rates and sampling times.

The data can be stored on the computer as a data file and displayed and processed (e.g. noise cancellation and filtering) using a conventional program or spreadsheet package. Mathematical programs held as spreadsheets or macros can be used with the data files to help interpret the variation of subsurface rock properties and fluid properties with depth (e.g. rock type, rock porosity and permeability fluid conductivity, salinity, etc.) using a number of assumed parameters such as overburden conductivity and acoustic propagation velocity.

It is believed that the method of the present invention makes use of an electrokinetic effect in which the seismic wave generated by the seismic source passes through successive rock layers suffering attenuation, reflection and refraction in the well known way. When the acoustic wave passes through a porous rock containing a fluid, it causes relative motion of the fluid and its host rock due to their different compressibilities which can cause the fluid to move through narrow capillaries in the rock. This movement can cause charge separation to take place and an electric dipole to be formed. This induced dipole can cause a disturbance of the slightly conducting medium of the overburden material which disturbance propagates upwards to the earth's surface, suffering some attenuation and dispersion according to the characteristics of the earth. This disturbance will propagate much faster than the seismic wave and theoretically should be at a speed equivalent to the speed of light in that medium.

In our invention the electrodes are electrically isolated from each other, unlike the system described in U.S. Pat. No. 4,904,942 where electrode pairs are connected through the primary coil of a transformer and consequently what is measured is a potential difference between the two electrodes. It was very surprising that, by measuring the electrical potential between a location and an earth insulated base point and comparing this with the electrical potential between the base point and a different location, an improved result is obtained compared with measuring directly the electrical potential difference between the two locations.

The method and equipment of the present invention can also be used for detecting the upper surface of a liquid underground.

By the upper surface of a liquid is meant the level where the liquid phase becomes essentially continuous, for example when all the free space in a porous rock becomes full of liquid. It is the point at which the fluid saturation of the porous rock reaches 100%, as opposed to the partially saturated rock above. When the liquid is water, this level is commonly referred to as the water table.

For detecting the upper surface of a liquid underground the degree of correlation of the signals from two different locations can be used to measure the depth of the water level.

The electromagnetic signals detected by a pair of electrodes generated from above the liquid level do not generally show a high degree of correlation with other radially aligned pairs of electrodes, whereas the signals generated from below the level of the liquid show a high degree of correlation. In addition signals from below the level of the liquid are generally of smaller magnitude. Thus the level of the liquid can be determined.

The electromagnetic signals from other causes, unlike electrokinetic signals do not show symmetry around the point where the seismic shock is initiated (the seismic shot point). Signals from the upper surface of a liquid in the ground or below this level suddenly become much more correlated between symmetric antennae i.e. the signal becomes much more radially symmetrical.

In detecting the upper surface of a liquid underground signals from two symmetrical pairs of electrodes or antennae are compared and the point at which they start to move together in phase corresponds to the upper level of the liquid. This occurs because electrokinetic signals come from vertical movement of fluid directly beneath the seismic shot point and the electric field generated is, as a result symmetric about the vertical and the shot point. Other signals, such as seismo-electric effects, electro-capillary effects etc. occur in partially saturated soil, in a random selection of regions of the soil sway from the points vertically below the shot point. These other signals, coming from off-axis, give asymmetric signals to a pair of antennae arranged about the shot point.

A specific embodiment of the invention will now be described by way of example with reference to the accompanying drawing in which.

Figure 1:
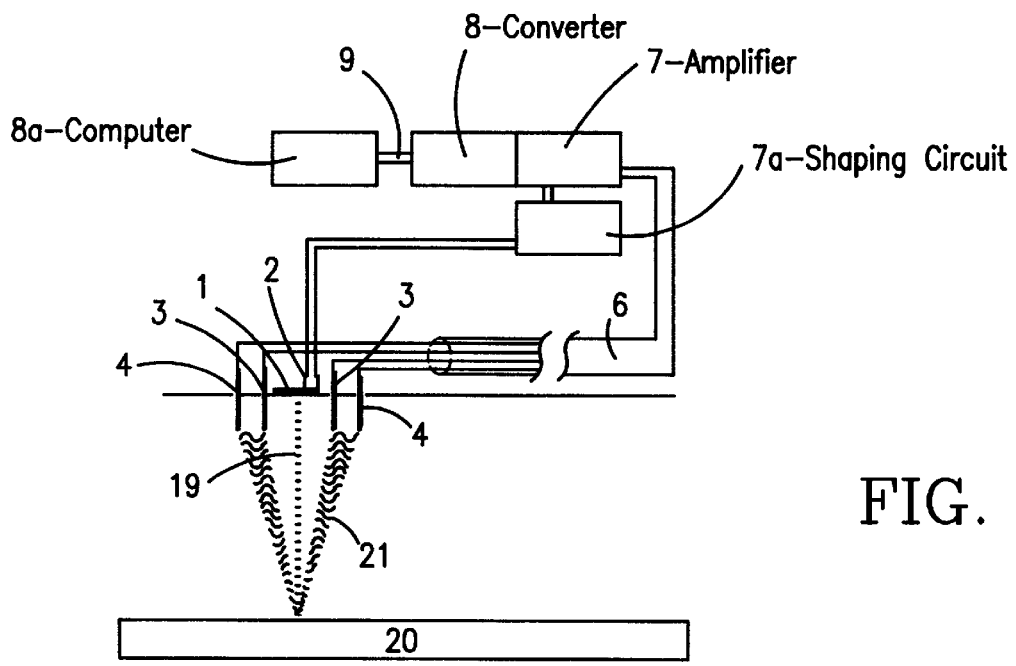
FIG. 1 shows diagrammatically the arrangement of the equipment on the surface of the earth and the passage of the seismic pulse and the signal in the subsurface.

Referring to FIG. 1 the equipment comprises an acoustic seismic source 1 which produces a seismic impulse 19 which causes the production of electrokinetic signals 21 which are detected by electrode pairs 3, 4. The equipment was electrically isolated from the earth except for the electrode pairs 3,4.

Figure 2:
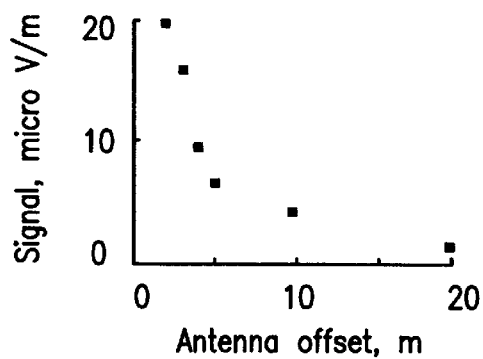
FIG. 2 is a plot of signal strength against distance of the antennas from the seismic source.

Referring to FIG. 2, the electrode pairs 3, 4, or antennas, were placed at various distances from the seismic source and an electrokinetic signal obtained using the above described method. This experiment led unexpectedly to the discovery that there is a rapid, non-linear reduction of the signal strength as the antennas are moved away from the seismic source. For this reason it is preferred that the inner electrodes 3 are placed as close as possible to the seismic source.

Referring again to FIG. 1, electrodes 3 and 4, each pair of which forms an antenna, are placed with the nearest electrode 3 being placed as close as possible to the seismic source and the outer electrodes 4 are placed far enough away from 3 that they pick up only a small proportion of the signal. Shielded cable 6 with the shield connected to the common line of the amplifier 7 is connected to the amplifier 7. The amplifier 7 is connected to the analogue to digital converter 8 and to a laptop computer 8a by a data bus 9. A separate cable 6a connects the trigger 2 to the analogue to digital convertor 8 via a pulse shaping circuit 7a.

Figure 3:
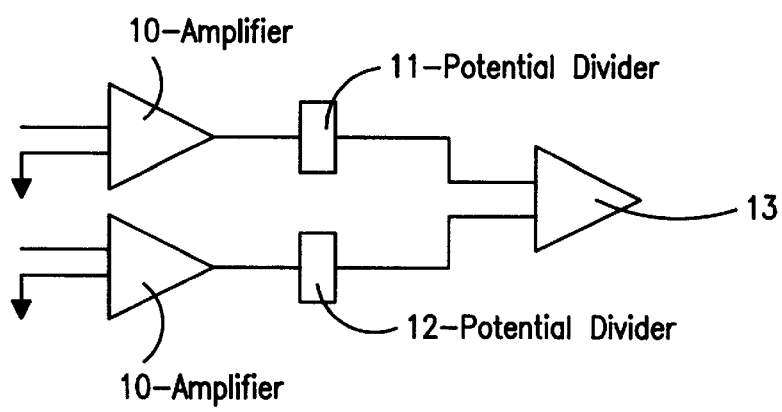
FIG. 3 is a diagram of the electrical circuit used in the equipment.

Referring to FIG. 3, the signal from each electrode 3 and 4 is directly coupled to separate impedance matching, low noise amplifiers 10 which have a modest gain, e.g. 20 dB and a low pass filter which attenuates radio waves by up to 70 dB without distorting the electrokinetic signal, which is typically in the range 20–200 Hz. The low pass filter also acts as an anti-alias filter. It was found that the use of notch filters of 50–60 Hz, as described in U.S. Pat. No. 4,904,942, caused severe distortion to the electrokinetic signal and they were discarded. The outputs of each first stage amplifier 10 are sent to separate potential divider circuits 11, 12. That on the inner electrode 12 is preset and is used to set the overall gain of the amplifier 7 to the required value. The signal from the outer electrode goes to a variable potential divider 11 which allows noise voltages to be matched to those coming from the inner electrode. Both potential dividers are capacitatively coupled to a differential amplifier 13, There is one differential amplifier 13 for each antenna. When the noise from the outer electrode is attenuated to match the noise from the inner electrode, differential stage 13 gives sufficient, e.g. 60 dB, common-mode noise rejection to enable the electrokinetic signals to be observed undistorted. Common mode noise, consisting mainly of mains supply hunt (usually 50 or 60 Hz) and long-wave radio interference (usually more than 100 KHz), is typically a few millivolts to a few volts at the electrodes 3, 4, whereas the electrokinetic signals are seldom more than a few millivolts at these electrodes. The signal is amplified by 7 so that one microvolt of input signal is equal to a known number of bits in the data acquisition system. The output of the final stage is connected to an analogue to digital converter board (A/D) 8 sampling at an adequate rate, e.g. 20 KHz per channel, and which is plugged into a conventional laptop computer 8a. The analogue to digital converter board (A/D) 8 and computer 8a handle all triggering, signal acquisition, display and storage functions in the normal way. The signal is observed for twice the time interval of interest so that the second part can be summed to the first part, out of phase at mains frequencies, to remove any remaining mains noise. Signal to noise ratios observed using the present invention are normally greater than 10:1 and may exceed 100:1. In previously described and used methods, signal to noise ratios have been worse than 1:1.

Referring to FIG. 1, in use the trigger 2 is actuated by the seismic source 1 which sends a seismic impulse down through the earth along path 19. The trigger pulse is shaped by 7a and starts the recording of a signal by switching the A/D convertor 8 and computer recorder 8a on. When the seismic pulse hits the layer 20 consisting of a porous and permeable sediment or rock containing liquid, an electrokinetic signal is generated which passes back up to the surface along the path shown diagrammatically as 21. When this signal reaches the surface, it is picked up by the electrode pairs 3 and 4 and passed along the shielded cable 6 to the operational amplifier 7, the analogue to digital converter 8 and then to the computer 8a. The computer then produces a graph of antenna voltage with time which can be interpreted to give the depth and nature of the liquid-saturated rock below the surface. This equipment measures the potential difference between the end of each electrode in the electrode pairs 3 and 4 arising from the electrokinetic effects of the seismic pulse and the non-earthed body of the equipment. The circuit used in the present invention compares these two potential differences to produce the graph.

Figure 4:
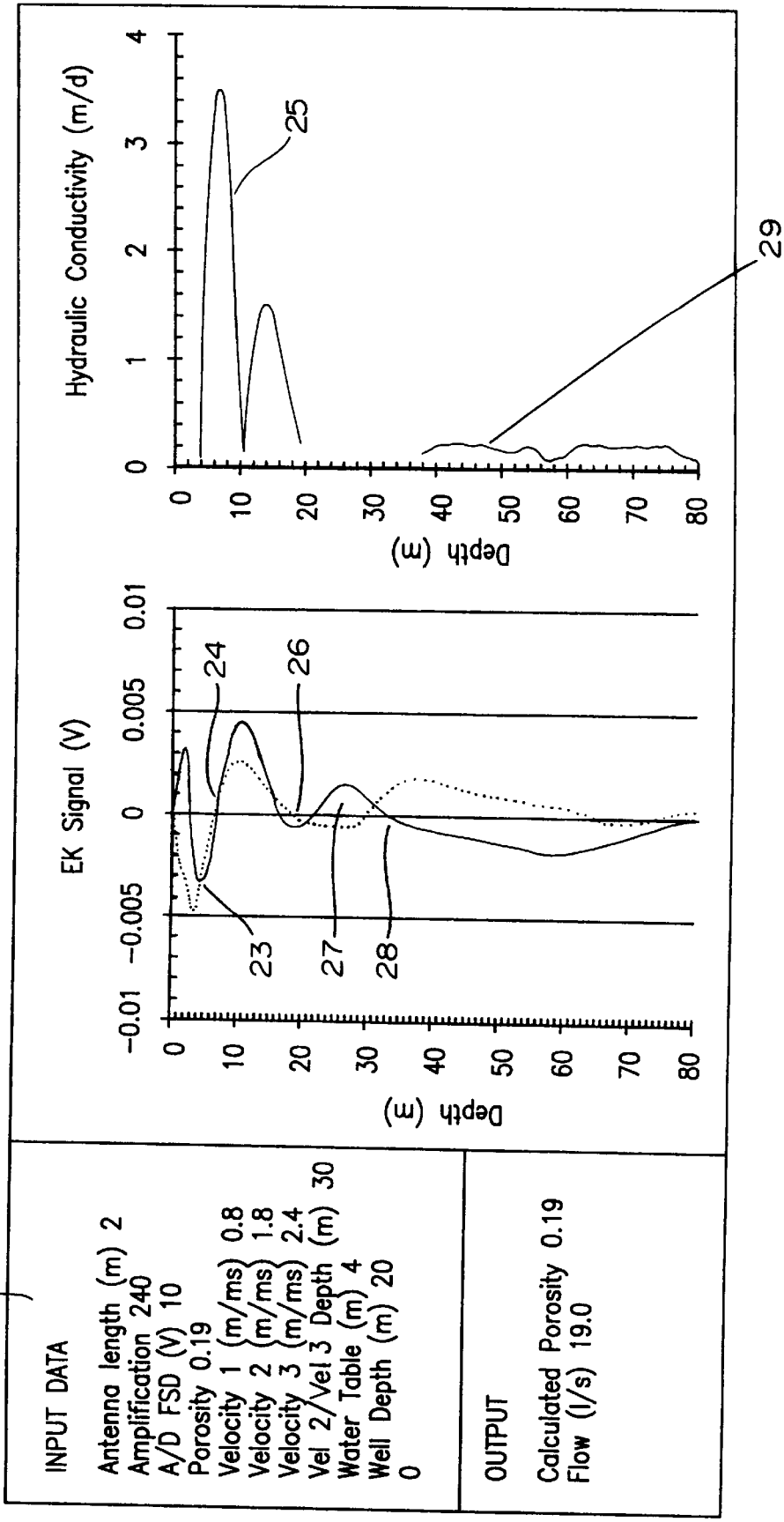
FIG. 4 is an example of the detection of a perched aquifer using the equipment.

Referring to FIG. 4, the above equipment was used to produce a record at a place where the Bagshot Sand aquifer is outcropping. The time of flight of the downgoing seismic impulse has been converted to depth using an appropriate velocity model as shown on the box 22 describing the input parameters.

The water table 23 can be clearly seen to be marked by the voltage traces from two antennas which are out of phase above the water table end in phase, or sub-parallel beneath it. The rate of change of the electrokinetic signal in the aquifer 24 defines the permeability of the aquifer and this is calculated and plotted against depth in chart 25. The signal from the Reading Beds 26, in aquiclude beneath the Bagshot Sands is essentially noise and no permeability can be calculated. Noise signals 27 define a partly saturated zone in the Upper Chalk. Electrokinetic signals from below the water table in the Upper Chalk 28 define its low permeability 29.

Because the equipment allows the electrokinetic signals generated by seismic impulses in sediments and rocks to be measured quantitatively the amplitude of those signals can be used to determine the sediment composition or rock lithology when the saturating liquid is of constant composition or the saturating liquid conductivity when the sediment or rock is of unvarying character. For example, the signal across the Bagshot Sand 24 quite clearly distinguishes ia from the Upper Chalk 28 and such distinctions are based upon the difference in the lithology of the Bagshot Sand and Upper Chalk and have geological significance.

Figure 5:
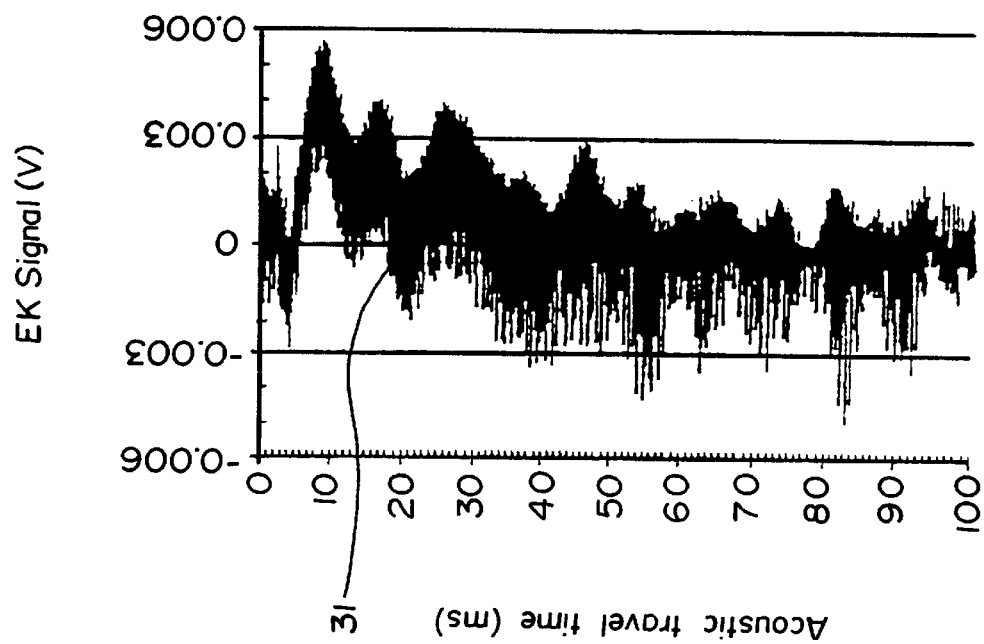
FIG. 5 is an example of results obtained using an embodiment of the invention compared with results obtained at the same site in identical conditions using prior art equipment.
Figure 5:
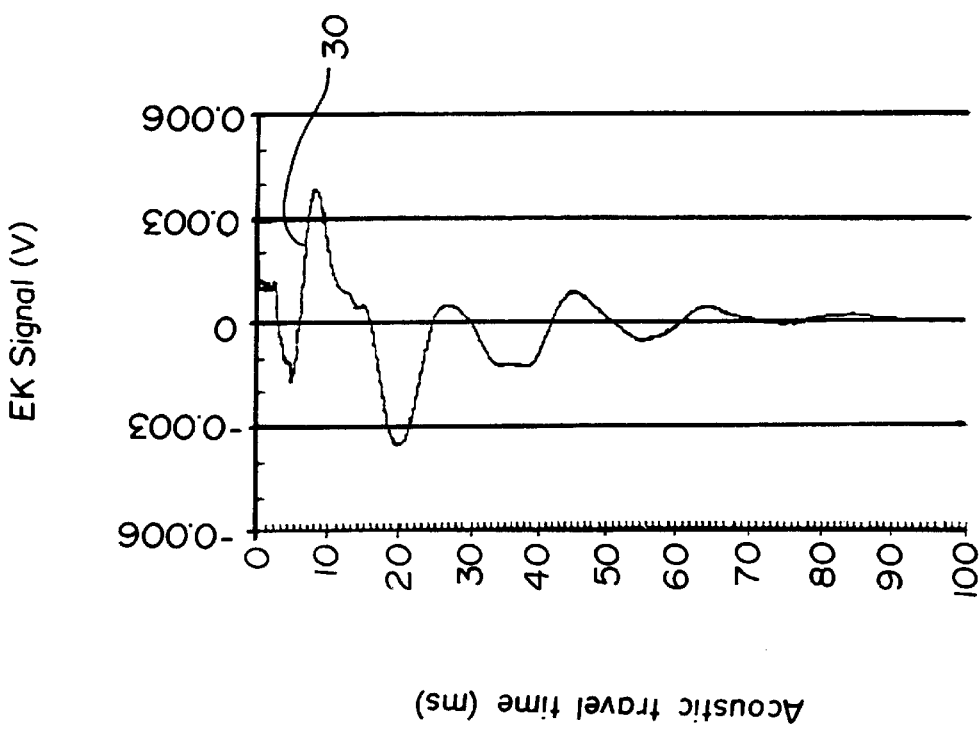

Referring to FIG. 5, observations were made at a single site under identical conditions (i) using equipment embodying the present invention as described in the drawings and (ii) using a high-quality instrumentation amplifier set up according to the Thompson Patent referred to above. The signal obtained using equipment of the present invention is shown at 30 and the signal obtained using the prior art equipment is shown at 31. It can be seen that the electrokinetic signal 30 recorded using an embodiment of the present invention is essentially noise free and is consequently susceptible further quantitative and qualitative analysis. The signal 31 obtained using the prior art equipment is both noisy and distorted and cannot be used without error for analysis.

We claim:

1. A method for detecting an underground liquid comprising: initiating a seismic impact which passes through the earth, and detecting and measuring the electrical potential generated by the shock from the seismic impact interacting with subsurface porous rock containing the liquid at at least two different locations, in which method the electrical potential at the said two different locations is measured with respect to a base point insulated from the earth, and the measured electrical potential of the said two different locations is compared so as to indicate the presence of the liquid by means of comparison means which generate a signal in proportion to the difference between the electrical potential at said two different locations.

2. A method as claimed in claim 1 in which said comparison means includes a differential operational amplifier, and the signals from each of the said two different locations are isolated and balanced before they reach the differential operational amplifier.

3. A method as claimed in claim 1 in which the electrical potential measured at each of said two locations is measured as the electrical potential difference between a non-earthed base point and the electrical potential at said location.

4. A method as claimed in claim 3 characterized in that the electrical potential is measured at each of said locations using detection means incorporating an electrode in contact with the earth at each location.

5. A method as claimed in claim 4 in which each electrode forms one part of a pair of electrodes.

6. A method as claimed in claim 5 including two pairs of electrodes with each pair of electrodes positioned on opposite sides of said seismic impact, and the electrical potential difference of each electrode in each electrode pair is measured and compared with that of the other electrode in the respective electrode pair.

7. A method as claimed in claim 1 in which the detection means comprises two pairs of electrodes in contact with the earth and spaced substantially symmetrically in a substantially straight line from the seismic impact so there is an inner and outer electrode in each pair.

8. A method as claimed in claim 7 in which the innermost electrode in each pair is placed immediately adjacent to said seismic impact.

9. A method as claimed in claim 7 in which the electrical potential measured at each of said two locations is measured as the electrical potential difference between a non-earthed base point and the electrical potential at each of said electrode pairs.

10. A method for detecting an underground liquid comprising: initiating a seismic impact which passes through the earth, detecting and measuring the electrical potential generated by the shock from the seismic impact interacting with sub-surface porous rock containing the liquid at at least two different locations, in which method the electrical potential at said two different locations is detected using detection means incorporating pair of electrodes comprising an antenna, each antenna consisting of an inner electrode and an outer electrode, and in which the antennas are arranged in an array and the antennas of the antenna array are disposed symmetrically about the seismic source so that along any flat plane passing through the seismic impact and an antenna, there is another antenna spaced at an equal distance on the other side of the seismic impact and the electrical potential at each of the said two locations is measured with respect to a base point insulated from the earth, and the measured electrical potential of said two different locations is compared so as to indicate the presence of the liquid by means of a comparison means which generates a signal in proportion to the difference between the electrical potential at the said two different locations.

11. A method as claimed in claim 10 in which there is a symmetrical arrangement of said electrodes around said seismic impact, and in which method only one signal is used to detect the presence of liquid.

12. A method as claimed in claim 11 in which the comparison means incorporates a differential operational amplifier and the signals from each of the said two different locations are isolated and balanced before they reach the differential operational amplifier.

13. A method as claimed in claim 12 in which the electrical potential measured at each of the said two locations is measured as the electrical potential difference between a non-earthed base point and the electrical potential at the said location.

14. A method as claimed in claim 11 in which the angle between a line drawn from the inner electrode in each electrode pair to the layer containing liquid, and a perpendicular line from the seismic source, is less than five degrees.

15. A method as claimed in claim 14 characterized in that said angle is less than two and one-half degrees.

16. A method for detecting an underground liquid as claimed in claims 10 or 11 in which the upper surface of the underground liquid is detected, and which incorporates a plurality of pairs of electrodes placed in or near the ground on opposite sides of the point where the seismic shock is initiated, and which includes comparing the signals detected by each electrode or pair of electrodes and uses changes in the signal and the degree of correlations of these signals to measure the depth of the upper surface of the underground liquid.

17. Equipment for detecting the presence of an underground liquid which equipment comprises: means for initiating a seismic shock at or near the surface of the earth; means for measuring and comparing the electrical potential generated by the interaction of the seismic shock with fluid contained in porous rock at at least two locations; and means for isolating the electrical signals generated at said at least two locations from each other.

18. Equipment for detecting the presence of an underground liquid as claimed in claim 17 in which the means for measuring and comparing comprises at least one pair of electrodes adapted to contact the earth, amplifier connected to the electrodes to which the signals from the electrodes are passed and data acquisition and recording means connected to said amplifier to record the signal so generated.

19. Equipment as claimed in claim 18 including separate circuit means for feeding the signals from said electrodes, and means for electrically isolating said signals from each other and from the earth.

20. Equipment as claimed in claim 19 in which the signals from said electrodes can be isolated and balanced before they reach the amplifier.

21. Equipment as claimed in claim 17 including means for compensating for differences in the contact resistance encountered between the electrodes and the earth for each electrode in said at least one electrode pair.

22. Equipment as claimed in claim 21 in which each of said electrodes is connected to a separate input amplifier stage, and including means to adjust the gain of that input stage.

23. Equipment as claimed in claim 21 or 22 including stable means for equalizing noise levels in said electrical signals.

* * * * *